United States Patent [19]

Hadamovsky et al.

[11] 4,118,313

[45] Oct. 3, 1978

[54] PROCESS AND APPARATUS FOR MASS TRANSFER BETWEEN HETEROGENEOUS SYSTEMS

[75] Inventors: Eugen Hadamovsky; Wolfgang Hoppe; Hans-Walter Overhausen, all of Witten; Bernhard Piotrowski, Bochum; Wehrhart Schmid, Karlsruhe; Georg Schreiber, Cologne-Rodenkirchen; Heinz Schroeder, Witten, all of Germany

[73] Assignee: Dynamit Nobel Aktiengesellschaft, Germany

[21] Appl. No.: 705,243

[22] Filed: Jul. 14, 1976

Related U.S. Application Data

[63] Continuation of Ser. No. 520,864, Nov. 4, 1974, abandoned.

[30] Foreign Application Priority Data

Nov. 3, 1973 [DE] Fed. Rep. of Germany ....... 2355106

[51] Int. Cl.$^2$ ............................................. B01D 11/04
[52] U.S. Cl. ...................................... 560/78; 210/83; 210/21; 210/521; 196/14.52; 422/257; 423/658.5
[58] Field of Search .................. 210/21, 83, 513, 515, 210/521; 23/270 R, 270.5 T, 272 AH; 196/14.52

[56] References Cited

U.S. PATENT DOCUMENTS

| 2,614,031 | 10/1952 | Tickler | ................................ 23/270.5 |
| 3,390,402 | 6/1968 | Goerg | ................................... 23/270 |

Primary Examiner—Ferris H. Lander
Attorney, Agent, or Firm—Craig & Antonelli

[57] ABSTRACT

A process for mass transfer between heterogeneous systems or phases in a vertical exchange column having at least one plate, a heavier stream of matter being introduced above the plate and, a lighter stream of matter being introduced countercurrently thereto from the bottom of the plate, wherein (a) a heavier stream of matter fed from the top is deflected, above the plate, into a mixing zone in which the heavier stream undergoes vertical rotary movement and is mixed with a lighter stream of matter passing from below through a first passgeway of the plate and introduced into the mixing zone to also undergo vertical rotary movement, (b) a heavier phase, suspension, or the like fluid-like mass forming in the mixing zone during the mass transfer therein is accumulated in a zone superjacent to a second passageway of the plate; and (c) after a sufficient pressure gradient has been built up, the accumulated mass flows as another heavier stream through the second passageway into a space underneath the plate and is at this location deflected into another mixing zone in which another heavier stream undergoes vertical rotary movement, having a sense or direction of rotation opposite to that in the mixing zone above the plate, and is mixed with a lighter stream of matter fed from below.

21 Claims, 7 Drawing Figures

PROCESS AND APPARATUS FOR MASS TRANSFER BETWEEN HETEROGENEOUS SYSTEMS

This is a continuation, of application Ser. No. 520,864, filed Nov. 4, 1974, and now abandoned.

This invention relates to a process for mass transfer between heterogeneous systems in an exchange column having at least one plate, to which is fed a heavier stream of matter from the top and countercurrently thereto a lighter stream of matter from the bottom; and to an apparatus associated therewith.

The term "mass transfer" as used herein is understood to mean, in this connection, not only diffusion processes as they occur, for example, during the extraction of systems with two phases immiscible with each other or having a mixture gap or with a solid phase and a liquid phase, but also, for example, mass transfer processes in scrubbing steps as they are conducted in connection with solids for the removal of impurities adhering thereto.

In these scrubbing procedures, the solids are moved, in a conventional manner, relatively to the scrubbing liquid whereby the impurities are more or less extensively transferred to the scrubbing liquid. Insofar as the impurities are soluble in the scrubbing liquid, the separation of the solids from the scrubbing liquid can be effected, for example, by means of a centrifuge. However, centrifuges are very expensive with regard to their initial cost and operation, especially in case of a continuous mode of operation, and primarily if such devices are to operate under increased pressure and/or must be constructed gastight in view of a volatile poisonous and/or flammable scrubbing fluid. Moreover, the centrifuges have the additional disadvantage — which holds also true for other processes, such as, for example, sedimentation or filtration — that a certain amount of residual moisture always adheres to the solid, with corresponding proportions of impurities, which can be reduced to a tolerable measure with respect to the permissible impurities only by repeated, expensive scrubbing and repeated centrifuging.

It is furthermore known to employ multistage fluidized bed systems for the continuous mass transfer between heterogeneous systems with a liquid and/or gaseous phase and a particulate solid phase. These fluidized bed systems are exchange columns having several perforated plates arranged horizontally at mutual spacings. In one type of these systems, the apertures in the perforated plates are dimensioned so that only the fluid can pass through, while the solid phase moves by way of special connecting ducts from one perforated plate to the next. In another type of system, in contrast to the above, the apertures in the perforated plates are fashioned so that the fluid as well as the solid phase can pass through countercurrently to each other. Although these systems are of a relatively simple structure, they have the basic disadvantage that they require, in view of the required fluidization of the particulate solid phase, a relatively large amount of fluid counterflow, i.e. for example a large amount of scrubbing liquid or extraction agent. This, however, is generally undesirable because of the expenditure for the required quantity of fluid and its possible subsequent separation from the substances absorbed by the solid phase. Additionally, there is the danger that the perforated plates, during operation, are gradually clogged up to a greater or lesser extent by the solid phase, whereby the efficiency of these exchange columns is correspondingly reduced.

The invention is based on the problem of avoiding the above-described disadvantages, i.e. to provide a process and apparatus for mass transfer between heterogeneous systems which, with a minimum of expenditure for the production and for the operation, result in optimum mass transfer without disadvantageous disturbances of the operation. In particular, for example, in extractions or scrubbing processes, the required amounts of extracting agent or scrubbing agent are to be minimal as related to the stream of matter to be treated. Besides, the mass transfer is also to be operable in case of very differing flow quantities by means of the same apparatus without disturbances; in other words, the exchange column is to exhibit maximum flexibility.

In order to solve this problem, the invention provides, for the mass transfer process between heterogeneous systems in an exchange column having at least one plate, to which is fed from the top a heavier stream of matter and, countercurrently thereto, a lighter stream of matter from the bottom, that (a) a first stream of matter fed from the top of the column is deflected, above the plate, into a mixing zone wherein the stream is in vertical rotary movement and is mixed with a second stream of matter that passes from below the plate through a first passageway defined by the plate and is introduced into the mixing zone;

(b) a heavier phase, suspension, or the like mass of matter forming in the mixing zone during the exchange process between the two streams is accumulated in a zone of a second passageway defined by the plate; and (c) after a sufficient pressure gradient has been built up, the accumulated mass forms a third stream that flows through the second passageway into a space underneath the plate and is there deflected into another mixing zone wherein the third stream is in vertical rotary movement, but in an opposite sense of rotation to that of the first stream, and is mixed with the second stream of matter fed from below.

The vertical rotary movement of the streams of matter during which the different phases of the heterogeneous system move along more or less closed circular, elliptical, or the like flow paths about an axis horizontal with respect to the vertical exchange column, results advantageously in an intimate intermixing of the phases with each other, thereby ensuring the required intensive mass transfer. In this connection, it is possible to superimpose on this vertical rotary motion also certain transverse flow motions, depending on the requirements of each individual case, without, however, impairing the thus-obtained advantageous effect in the mixing zone. The intensive intermixing is furthermore enhanced by the fact that a lighter stream of matter, passing from below through the first passageway of the plate, is advantageously dispersed during its meeting with a deflected, heavier stream of matter and its penetration into this heavier stream.

The heavier phase, suspension, or the like formed during the mass transfer within the initial or first mixing zone is enriched, due to the differences in density, in the zone superjacent to the second passageway provided in the plate. Thereby, a calm zone for the heavier phase, suspension, or the like is created above the second passageway. If the enrichment in this calm zone has progressed to such an extent that the pressure ambient in the region of the second passageway is sufficiently higher than the pressure in the zone subjacent to the first passageway, the heavier phase, suspension, or the like passes through the second passageway in the downward direction and is again deflected into a vertical rotary movement underneath the plate of the exchange column and is mixed with the lighter stream of matter fed from the bottom. During this step, a further calm zone is then produced, namely underneath the first plate passageway, where the lighter stream of matter is accumulated and flows from there, due to the aforementioned pressure gradient, into the space above the plate.

To provide a maximally advantageous formation of these vertical rotary movements of streams and the concomitant mixture zones and calm zones, the spaces above and below the at least one plate must have a certain minimum height. In view of the pressure gradient required for the rotary motion between the two passageways, depending inter alia on the difference in concentration and the hydrostatic height of the multiphase system in the region of the passageways there is also a dependency between the free passage cross sections of the first and second passageways and between these cross sections and the inside cross section of the exchange column proper. The optimum values applicable in this regard depend on numerous influential variables. Thus, the type of mass transfer process is of importance, i.e. whether an extraction or, for example, a scrubbing operation is to be executed. The substances contained in the streams of matter, the flow characteristic of the individual components, both absolute and in relation to each other, the phase condition of the components, their diffusion properties, etc. furthermore affect the flow relationships within the exchange column. In view of the large number of heterogeneous systems possible under practical conditions, it is thus generally advantageous to determine in each individual case the most favorable mode of operation for the process and the most advantageous design for the plant by means of corresponding optimization experiments. One example in this connection worth mentioning is that, in scrubbing operations with solid-liquid systems, these optimum values generally are in a range of 1-25% regarding the ratio of the free passage cross section of the first passageway to that of the second passageway, and 3-33% with respect to the ratio of the free flow cross section of the second passageway to the free cross section of the exchange column.

In a suitable embodiment of the invention, the deflection into the vertical rotary movement is effected by means of a baffle element projecting into the inside cross section of the exchange column, this baffle element being disposed to extend from the side wall of the exchange column and/or close to the sidewall of the column and being inclined in the downward direction. This mechanical deflecting means, i.e. the inclined baffle, is simple in structure, reliable in operation, and moreover also provides advantageously a maximally complete utilization of the inside cross section of the exchange column for the formation of the rotary movement, due to the fact that its deflecting action already begins close to the sidewall of the exchange column.

As can readily be seen, the mass transfer in an exchange column with only a single plate will be satisfactory only if lesser requirements are posed with respect to the extraction or purification effect or the like, even when using the process according to this invention, because the formation of the rotary movements is interfered with by the feed and discharge lines for the streams of matter at the head and in the sump of the exchange column. Therefore, in order to meet higher demands with regard to the attained mass transfer, a process is provided using an exchange column subdivided into several stages by means of two or more plates arranged at mutual vertical spacings wherein, according to a further aspect of this invention, the streams of matter are set into vertical rotary movements with a, respectively, opposed sense of rotation in subsequent stages. In such a process, a mixing zone and corresponding calm zones are formed in each stage. The streams of matter are moving — considering the exchange column as a whole — through the column in a meandering path, whereby a particularly advantageous exploitation of the column height has been made possible. Suitably, here again the plate spacing most favorable for an individual case is determined by optimizing tests. The remixing between the individual phases or component streams is very minor, so that even with a low number of stages, very good mass transfer results are obtained. Since the rotary movements are produced already in case of relatively small streams of matter, the flexibility of an exchange column operated in accordance with the process of this invention with respect to mass throughput is extraordinarily high as compared to the conventional countercurrent methods. Furthermore, relatively high flow velocities are achieved between the individual stages in the regions within the first and second passageways, whereby a correspondingly high throughput per unit area is obtained.

If, in the mass transfer process, a particulate, solid phase is withdrawn from the sump of the exchange column, disturbances may in certain cases be encountered in the discharge of the solid phase, depending on the flow characteristic of these particles and the still present proportion of a liquid phase. In this case, another aspect of this invention provides that a premixing liquid which loosens up the solid phase is introduced into the sump. Advantageously, considering the undesirability of additional mixing steps and consequently possibly required separating steps, for example in a scrubbing process, the same liquid, solution, solution mixture, or the like will be selected for the premixing liquid as for the scrubbing liquid, which liquid is likewise supplied in the sump of the exchange column.

In order to promote the enrichment of the particulate solid phase in the region within the second passageway during the startup period of the exchange column in a mass transfer in a heterogeneous system, the heavier mass stream which contains a particulate solid phase, or which consists of such particulate solid phase, a further embodiment of this invention resides in that, during the startup period of the exchange column, preferably when the plate is disposed horizontally, no countercurrent stream is fed from below, or only a relatively small quantity of such stream is fed from the bottom. This advantageously avoids or reduces an initially undesirable disturbance of the settling action in the region within the second passageway, i.e. the startup time of the plant is shortened; in other words, the intended steady operating condition is reached more rapidly.

In order to carry out the process of this invention, an apparatus is provided with an exchange column having at least one plate wherein, according to this invention, the plate covering or extending across the inside cross section of the exchange column has a first passageway, and a second passageway in the zones adjacent to its edge, and a baffle element is provided in the zone superjacent to the first passageway. These passageways are preferably arranged directly at the edge of the plate, i.e. immediately along the inner wall of the exchange column; however, it is also possible to provide the passageways at a certain spacing from the wall, if this should prove advantageous in a particular case. The size of the two passageways is selected — as mentioned above — so that, on the basis of the pressure gradient built up in the calm zone of the second passageway, the stream of matter flows sufficiently quickly through the second passageway to attain underneath the plate again the desired vertical rotary movement which provides for the intensive intermixing with the lighter stream of matter fed from below the plate. This flow characteristic is generally accomplished if, according to a further suggestion of the invention, the first passageway is formed with a smaller passage cross section than the second passageway.

If, in place of an exchange column with a single plate, a vertical column is used containing several spaced apart plates to attain a more intensive mass transfer, the invention provides that in successive plates the passageways of the same type are located mutually offset, preferably in mutual opposition. Thus, for example, in one plate the first passageway is arranged on the left-hand edge, while the same type of passageway is disposed, in the subsequent plate, on the right-hand edge, preferably in exact opposition to the passageway of the other plate. This ensures advantageously that the corresponding passageways are located where the calm zones associated with the vertical rotary movement of the streams of matter are formed automatically, so that no additional baffle means are required and an advantageous utilization of the column height is provided.

In accordance with a further provision of the present invention, the at least one plate of the vertical exchange column is arranged horizontally, and the baffle element is an inclined baffle sheet, baffle plate, or the like starting at the outer edge of the exchange column, which is mounted above the plate, leaving a gap between its inner bottom edge and the horizontal plate defining the passageways. In this arrangement, the flow characteristic of the stream of lighter matter passing from below through the first passageway is naturally additionally affected by the size of the gap between the lower end of the baffle sheet, baffle plate, or the like and the plate.

A particularly advantageous embodiment of the apparatus of this invention is characterized in that the at least one plate of the vertical exchange column is disposed in an inclined position and the upper section thereof forms simultaneously the baffle element. The installation of a separate baffle element is thus unnecessary. The first passageway is formed in the upper region of the plate, while the second passageway is located at the bottom. The oblique arrangement of the plate furthermore enhances the formation of the calm zones in the angular areas above the second passageway and/or underneath the first passageway, since during the normal, steady operating condition of the exchange column, the vertical rotary movement of the stream does not affect these areas at all or only to a slight extent, as contrasted to the case where the plate is arranged horizontally. If this oblique positioning of the plate is provided also in exchange columns with several plates, multistage inclined-plate devices or columns are obtained which are distinguished by relatively minor structural heights as compared to the mass transfer attained thereby. This is so, because in these columns, the two calm zones, separated by the inclined plate, are arranged so to speak in a side-by-side relationship, while they are always disposed one above the other in a column having horizontal plates. In case of several plates, successive plates are disposed, respectively, inclined in opposite directions.

The angle of inclination of the plate or plates in an inclined-plate column here again depends on the kind of heterogeneous system present in each individual mass transfer process. Thus, in case of a scrubbing step for example, with a heavier mass flow containing a particulate solid phase, the angle of inclination will preferably be selected to be just so large that a loose layer of solids is collected in the lower zone of the plate, i.e. above the second passageway, of such a kind that the optimum pressure gradient with respect to the first passageway, required for the rotary movement, is provided. If the angle is chosen to be too large, i.e. if the plate is inclined too much, there is the danger that a bridge formation of solids occurs in the layer of solids above the second passageway, and the further transport into the zone underneath the plate is disturbed or even prevented. Also, the structural height of the exchange column is unnecessarily increased thereby. In contrast thereto, the relationships are different, for example, in extraction processes in a liquid-liquid system, since large calm zones and/or settling regions and correspondingly large angles of inclination have proven to be advantageous in this case. Inasmuch as a particulate solid phase is absent, there is no danger of an interfering bridge formation in the zone above or within the second passageway. Therefore, with a view toward a maximally economical mode of operation, it is once again advantageous to determine the optimum angles of inclination for the formation of the rotary movement and the phase distributions between the two calm zones in each individual case by appropriate optimization experiments.

According to the invention, in case of an obliquely arranged plate, the plate can furthermore be provided with other perforations, slots, or the like, in addition to the first passageway, in the region adjoining this passageway. This measure proves advantageous, for example, to prevent a particulate solid phase tending toward bridge formation, such as, for example, the platelet-shaped crystals of dimethyl terephthalate (DMT), from adhering more or less to the inclined plate under unfavorable circumstances. This adherence is prevented by providing that the lighter stream of matter fed from below the inclined plate passes in the upward direction not only through the first passageway but also, to a minor proportion, through the holes, slots, or the like in the upper zone of the plate, thereby additionally loosening the layer of solids. These auxiliary passages are restricted to the upper zone of the plate to avoid disturbances by the lighter stream of matter in the area of the lower calm zone.

The invention will be further understood from the schematic views of different embodiments and from the detailed description made in reference thereto, wherein.

Figure 1:
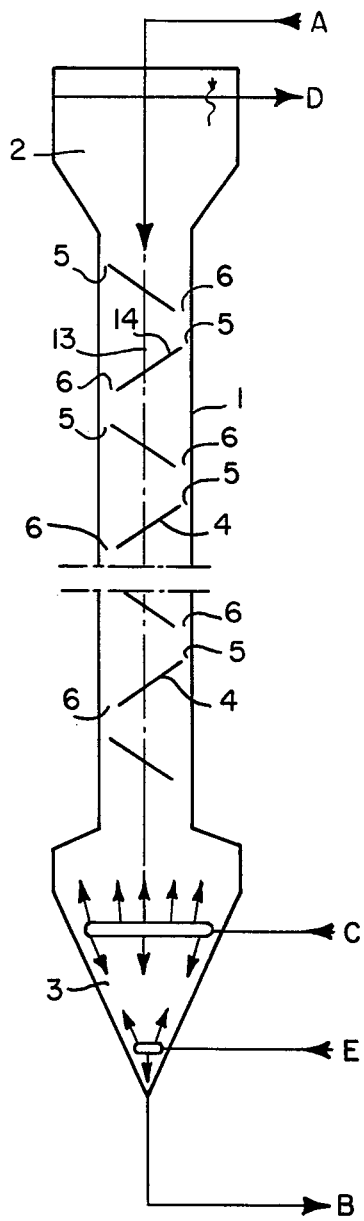
FIG. 1 illustrates an exchange column for solid-liquid systems.

The exchange column 1, shown schematically in a shortened representation in FIG. 1, with the head 2 and the sump 3 is provided with the obliquely disposed plates 4 each with a first passageway 5 and a second passageway 6. At A, the heavier stream of matter is introduced via a feed pipe centrally arranged in the head 2, this stream being, for example, a suspension of dimethyl terephthalate (DMT) and filtrate to be purified. The filtrate is a methanolic solution of the unusable residues of crude DMT containing primarily dimethyl isophthalate (DMI) and dimethyl orthophthalate (DMO) but also high-boiling substances and certain minor proportions of DMT. After the mass transfer has taken place, the the heavier stream of matter is withdrawn at B, this being in the present case the purified DMT in the scrubbing liquid, which in this case is methanol. The lighter stream of matter, i.e. methanol, is introduced at C by means of a ring conduit disposed in the sump 3 and flows through the exchange column 1 from the bottom toward the top countercurrently to the heavier stream of matter. In the head 2, the lighter stream of matter is discharged at D, this stream being, in the chosen example, a mixture of filtrate and methanol. Finally, in the sump 3, a premixing liquid is introduced additionally at E, which likewise is methanol, in order to facilitate the withdrawal of the heavier stream of matter at B.

Figure 2:
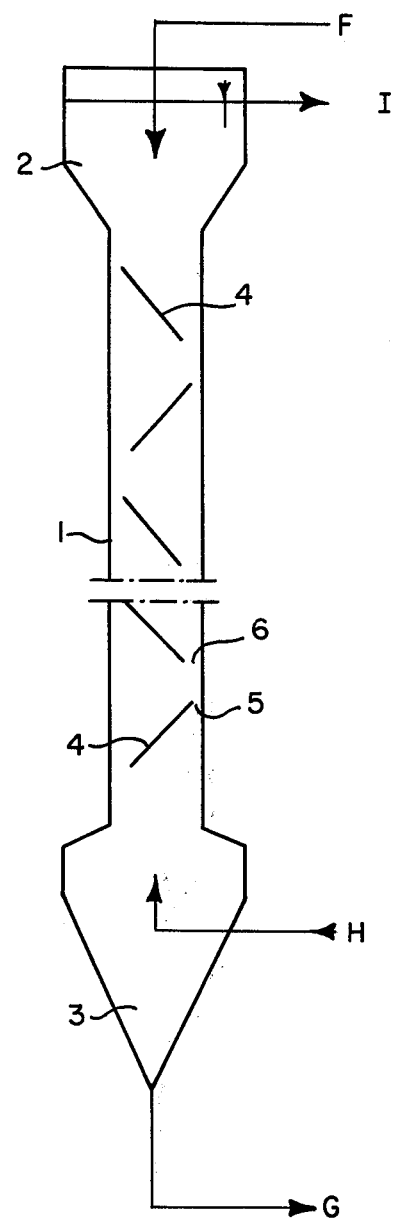
FIG. 2 shows an exchange column for liquid-liquid systems.

As constrasted to the countercurrent scrubbing process illustrated in FIG. 1, FIG. 2 shows an exchange column for extractions in liquid-liquid systems, as they are used, for example, to separate a xylene-acetate acid solution. Also, in this instance, the heavier stream of matter, in this case water, is introduced at F in the head 2 of the column 1 with plates 4 and passageways 5, 6, and is withdrawn at G as so-called extract, in this case water in solution with acetic acid. The lighter stream of matter, in this case a solution of xylene and acetic acid, is introduced at H in the sump 3 and the product discharged at I in head 2, is in this case separated xylene. Of course, such an exchange column could also be utilized in a similar manner for the conductance of extractions, for example, in solid-liquid systems as is the case, for instance, in the extraction of soybeans by means of hexane, but wherein the flow conditions approach those encountered in solid-liquid countercurrent scrubbing processes.

Figure 3:
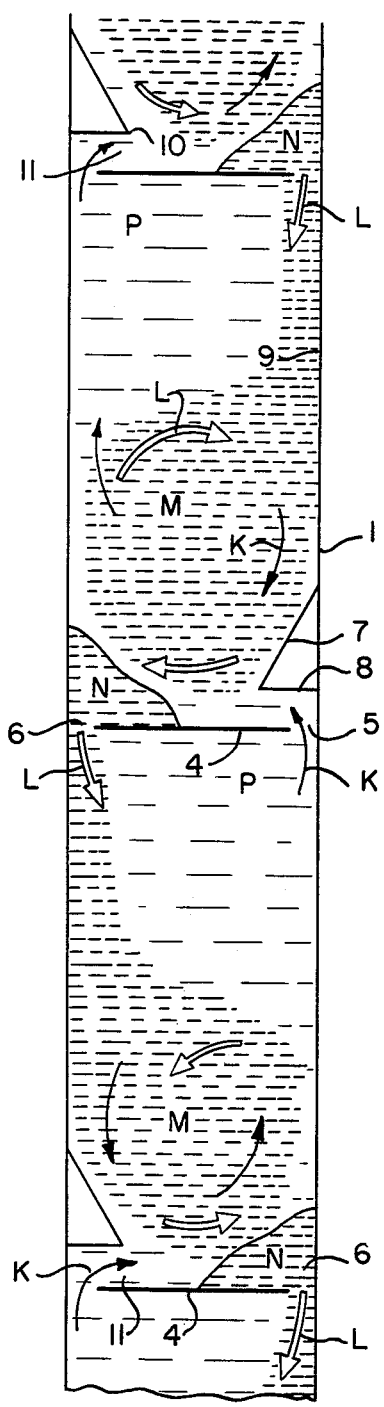
FIG. 3 shows the flow relationships in an exchange column with horizontal plates.

FIG. 3 shows a fragment of an exchange column 1 with horizontally disposed plates 4; above the first passageway 5, a baffle element is provided which in this case is a baffle plate 7 projecting obliquely into the exchange column 1 and closed off on its underside by a short horizontal plate 8 to prevent undesired deposits between the baffle and the inner wall 9 of the exchange column 1. Between the lower edge 10 of the baffle element and the plate 4, the gap or zone 11 is formed. The lighter stream of matter, indicated by the single arrow K, passes through the first passageway 5 and the gap 11 in the upward direction, while the heavier stream of matter, indicated by the double arrow L flows through the passageway 6 of the plate 4 in the downward direction. In the region M, which is the mixing zone, the heavier stream of matter is deflected by the baffle element into a vertical rotary movement, in which the lighter stream of matter is included. The mass transfer, on the one hand, but also again the separation of the resulting streams of matter due to the existing density differences, on the other hand, take place in the mixing zone M. During the steady operating condition, the heavier stream of matter is enriched in the region N, here indicated by shading, above the second passageway 6, while the lighter stream of matter is collected in the zone P underneath the first passageway 5. The heavier stream of matter is enriched at N in FIG. 3 because of the given sense of rotation of the turbulence (rotating in the clockwise direction in the upper portion of this figure). Therefore, the heavier stream of matter cannot pass through the first passageway 5, especially since at that point the lighter stream of matter flows from the bottom toward the top. From here, the streams of matter then pass over into the adjacent stages of the exchange column 1, the composition of the mass streams being progressively altered due to the mass transfer processes taking place in the individual stages.

The dimensions of the slot or gap 11 in FIG. 3 are again — as explained above — dependent on the system. The reason why the heavier stream of matter does not pass through this slot 11, but rather flows through the second passageway 6 in the downward direction, is found in the direction of rotation of the turbulence formed above the respective plate.

Figure 4A:
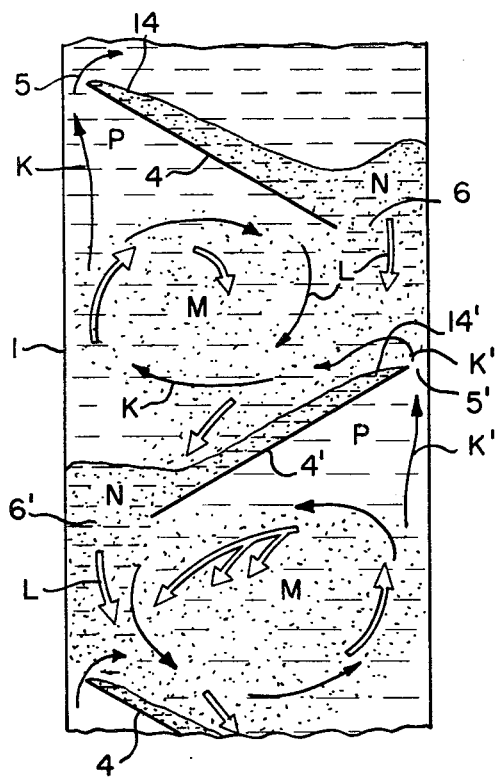
FIGS. 4a and 4b show the flow relationships in a column with inclined plates.
Figure 4B:
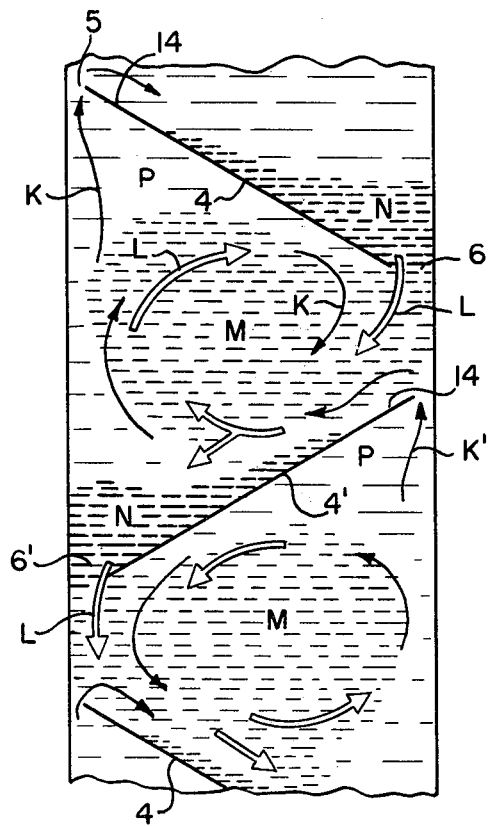

FIGS. 4a and 4b show fragmentary views of multistage inclined-plate columns. The arrangement shown in FIG. 4a, with second passageways 6 which are relatively large as compared to the first passageways 5, is suitable especially for mass transfer in solid-liquid systems, i.e., for example, a DMT counterflow scrubbing procedure. The function of a plate of this column will be explained in detail hereinbelow. According to arrow K, the lighter liquid is conducted through the column from the bottom toward the top, while a suspension of solid particles, e.g. DMT of higher density is introduced from above. The solid particles move downwardly in accordance with the laws of the rate of vertical descent for particle swarms. During the startup of the exchange column 1, starting with a certain quantity of solid particles and/or amount of countercurrent liquid fed from below, the velocity of the streams in the passageways 5, 6 becomes so high that the particles can no longer pass therethrough and are concentrated, which occurs due to the inclined disposition of the plate 4 in the region above the lower passageway 6. During this process, the particles are lifted by the countercurrent liquid still passing through the lower passageway 6 and are already set into a vertical rotary movement which, however, still has a relatively small spatial expansion.

During the further feeding of solid particles, the particles are accumulated in the lower region of the plate 4 and build up a particle layer at that location which, in accordance with the pressure relationship of the two streams of matter, has liquid flowing therethrough. Once a sufficiently large pressure gradient has been built up in this way in the region above the passageway 6, the suspended solid particles flow, in accordance with the arrow L, through the lower passageway 6 of the plate 4 in the downward direction into the subsequent stage, while, to compensate therefor, lighter countercurrent liquid flows according to arrow K through the upper passageway 5 of the same plate 4 in the upward direction. The downwardly flowing particle suspension is deflected by the upper zone 14' of the subsequent plate 4' and entrains during this step also the countercurrent liquid passing through the upper passage 5' thereof, in accordance with arrow K', thus dispersing this liquid and intermixing same with the particle suspension. A strong current is formed along the upper and central zone of the plate 4' which is deflected in the lower region of this plate along the particle layer present at that location, in the upward direction.

Thereby, a vertical rotary movement of streams is created which takes place, just as the rotary movement during the startup period, in the clockwise direction, but in contrast to this startup period encompasses a very much larger space proportion of the stage. In this region, which is the mixing zone M, the two streams of matter are intensively mixed together so that here the mass transfer can take place under maximally favorable conditions. The mixing zone M is defined in the downward direction by the settling or calming zone N, differentiated from the mixing zone M in the figure by a closer shading. In the upward direction, the mixing zone M is approximately limited by an imaginary horizontal plane extending through the lower edge of the upper plate 4. The settling or calming zone P is formed in the space above this plane. Practically only the lighter concurrent liquid is present in this zone, since under normal operating conditions the flow velocities in this region are too low to suspend particles or even convey same. A rather clear layer of liquid is formed above the unquiet heterogeneous current surface of the mixing zone M.

These processes, described for one stage, are repeated correspondingly in the further stages of the exchange column 1, but the sense of rotation of the rotary movement is reversed from one stage to the next. Practically always the same flow configurations occur, although the composition of the streams of matter changes progressively from one stage to the next. In acccordance with the example of a DMT counterflow scrubbing process, mentioned above in connection with FIG. 1, this would mean that the contaminated suspension of DMT and filtrate is still enriched in the uppermost stage or upper stages of the exchange column in the calm zones N, from which the filtrate is removed by exchange with methanol the more so, the further the heavier stream of matter progresses downwardly in the exchange column, until finally in the sump of the exchange column the practically pure suspension of DMT and methanol can be discharged. Conversely, the countercurrent bottom liquid, methanol, is altered, which is enriched in the calm zones P and contains the more filtrate the closer to the head 2 of the exchange column 1.

This steady operating condition of the exchange column explained in connection with FIG. 4a for a solid-liquid system represents a state of equilibrium between the streams of matter which automatically adjusts itself and also controls itself advantageously within wide load limits, i.e. the exchange column adjusts itself, so to speak, automatically to the required efficiency. Assuming, for example, a constant amount of countercurrent liquid, which can be very easily regulated and maintained, the layer above the lower or also above the second passageway 6 is increased when the heavier stream of matter is increased and thus the particular stream is also enlarged. However, this increases the pressure gradient, which, in turn, results in a rise in absolute velocity of the particle stream through the passageway 6 in the downward direction to the subsequent stage.

In contrast thereto, if with a constant countercurrent liquid quantity the particle stream is greatly diminished, a pulsing flow of the particles through the lower passageway 6 to the next-lower plate is created. The countercurrent liquid then flows, on the one hand, through the upper passageway 5 and, on the other hand, likewise in a pulsing flow through the lower passageway 6 in the upward direction. In the latter case, the countercurrent liquid then enters the vertical rotary movement formed above the plate in a tangential orientation and thus further enhances the formation of this current or stream movement.

Even in case of a very small amount of counterflow, the automatic or self control of the exchange column of this invention is still so pronounced, i.e. the maintenance of the rotary movement and thus also the dwelling of the particles in the individual stages, that a rapid emptying of the separating column is possible only by a cocurrent conductance of both streams of matter.

When the efficiency of the column is exceeded by too large a load of the particle stream, the layer of particles above the lower passageway 6 is greatly increased, whereby first of all the rotary movement of the stream is restricted to a smaller spatial proportion of the stage; with a further increase in particle load, this rotary movement will finally disappear altogether. When the amount of particles fed is still further increased, the particles begin to flow upwardly and thus clog the column.

Analogously the corresponding flow configurations are obtained with a constant particle stream and a variable amount of countercurrent liquid.

In FIG. 4b, the flow configurations are illustrated as they occur during the steady operating condition of an exchange column for liquid-liquid systems. Reference numerals identical to those used in FIG. 4a have been used for the corresponding elements. The only difference as compared to FIG. 4a is that there is no solid particulate phase and, accordingly, the second passageway 6 is a little larger than the first passageway 5. Depending on the type of heterogeneous system employed, it could even be possible under certain circumstances that the passageway 6 must have a smaller inside passage cross section than the passageway 5, in order to attain the optimum pressure gradient required for the vertical rotary movement of the stream. For example, assuming in conformance with FIG. 2, that the present heterogeneous system involves the separation of xylene and acetic acid, the stream of matter accumulating in the calming zones N contains water with an acetic acid content which progressively increases from the top toward the bottom of the column, while correspondingly the stream of matter collected in the calming zones P contains progressively smaller amounts of acetic acid from the bottom toward the top of the column, until finally practically pure xylene can be withdrawn from the head 2 of the column 1. A corresponding intermixing of the two streams of matter takes place in the mixing zone M. Here again, the process of the present invention proves to be advantageous, since the expenditures for the apparatus and its operation are favorably lower due to the intensive mass transfer, as compared to the conventional processes, with the same amount of water employed for the countercurrent medium.

Figure 5A:
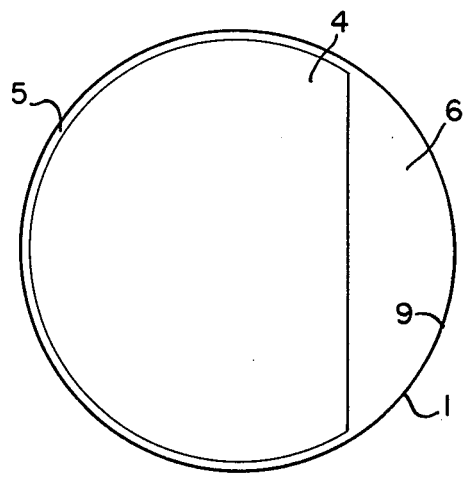
FIGS. 5a and 5b show various plate configurations.
Figure 5B:
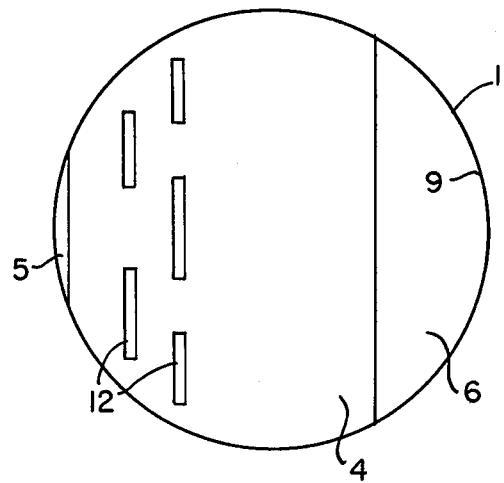

FIGS. 5a and 5b, finally, show two embodiments for possible configurations of the plate 4. According to FIG. 5a, the plate 4 shown in a top view is arranged horizontally or in an inclined position within the exchange column 1, the column having a circular cross section. The first passageway 5 is, in this case, fashioned as a narrow annular gap between the inner wall 9 of the exchange column 1 and the plate 4 which is made, for example, of sheet metal. The passageway 5 passes over directly into the second, large passageway 6, but could also be separated therefrom by a more or less wide bridge. The plate 4 is attached in the exchange column 1 by means of struts, mounting angles, or the like, not shown. The plate 4 shown in FIG. 5b likewise in a top view has a first passageway 5 arranged in opposition to the second, larger passageway 6 and is separated therefrom. This arrangement, is geneally more advantageous than that of FIG. 5a. In a zone adjoining the first passageway 5, additional perforations, slots, or the like, denoted by reference numeral 12, can optionally be furthermore provided.

The process of this invention for continuous mass transfer between heterogeneous systems, explained hereinabove with the use of examples of a countercurrent scrubbing step and an extraction, can always be utilized advantageously if it is desired to execute mass transfer processes - optionally also in conjunction with heat exchange processes — with a minimum of remixing, a maximum operating stability, a minimum amount of counterfow and/or with strongly fluctuating streams of matter.

To further explain the process of this invention, several experiments are set forth hereinbelow in the form of examples:

EXAMPLE 1

| System: DMT/filtrate - methanol | |
|---|---|
| Apparatus: | Vertical glass column, diameter-225 mm., height-4,000 mm., cross section-395 cm² |
| Installations: | (a) 16 inclined plates, plate spacing (measured between like plate points)-240 mm., |
| | (b) inclination (with respect to the horizontal) 40° |
| | (c) inside cross section of the first passageway-approximately 16 cm² |
| | (d) inside cross section of the second passageway-154 cm² |
| Feed: | (a) 320 l./h. of suspension with 300 g. of DMT per liter of filtrate |
| | (b) 350 l./h. of methanol |
| Discharge: | (a) 290 l./h. of suspension with 350 g. of DMT per liter of methanol |
| | (b) 380 l./h. of filtrate-methanol solution |
| Acid number: | (a) starting material-1.8 |
| | (b) final product (scrubbed DMT)-0.6 |
| Operating Conditions: | normal pressure and 40° C. |

The acid number is a measure for the purity of the DMT and indicates how many milligrams of potassium hydroxide is required to neutralize a solution of 1 gram of product in chloroform.

In comparison therewith, the acid number of the same starting material, after a conventional, complicated centrifuging step which must be executed twice, with a premixing with methanol of the same purity as in the example between the centrifuging steps, is 0.4 Thus, in accordance with the process of this invention, a product of practically the same purity was obtained with a considerably lower expenditure.

EXAMPLE 2

| System: DMT/filtrate - methanol | |
|---|---|
| Apparatus: | Vertical column of stainless steel, diameter-900 mm., height-5,000 mm., cross section-6,360 cm² |
| Installations: | (a) 8 inclined plates, spacing between like points of the plates-450 mm., inclination with respect to the horizontal-30° |
| | (b) inside cross section of the first passageway approximately 90 cm² |
| | (c) inside cross section of the second passageway |

-continued

| System: DMT/filtrate - methanol | |
|---|---|
| | 278 cm² |
| Feed: | (a) 6,000 l./h. of suspension with 300 g. of DMT per liter of filtrate |
| | (b) 4,800 l./h. of methanol |
| Discharge: | (a) 5,500 l./h. of suspension with 330 g. of DMT per liter of methanol |
| | (b) 5,300 l./h. of filtrate-methanol solution |
| Acid number: | (a) starting material-1.2 |
| | (b) final product-0.15 |

EXAMPLE 3

The system and the apparatus as well as the installations are those of Example 2, except that the inside cross section of the second passageway is 2,190 cm².

| Feed: | (a) 5,000 l./h. of suspension with 300 g. of DMT per liter of filtrate |
|---|---|
| | (b) 5,500 l./h. of methanol |
| Discharge: | (a) 4,500 l./h. of suspension with 350 g. of DMT per liter of methanol |
| | (b) 6,000 l./h. of filtrate-methanol solution |
| Acid number: | (a) starting material-1.18 |
| | (b) final product-0.21 |

As compared to Example 2, due to the fact that the second passageway was selected more unfavorably, the methanol expended is very much larger in amount, with a poorer acid number of the final product.

EXAMPLE 4

| System: glass beads in dirty water - water, average bead diameter 0.15 mm. | |
|---|---|
| Operating Conditions: | normal pressure and 20° C. |
| Apparatus: | Vertical glass column, diameter-40 mm., height-1,000 mm., cross-section—12.6 cm² |
| Installations: | (a) 10 inclined plates, spacing between the same points 35 mm., inclination with respect to horizontal-30° |
| | (b) inside cross section of the first passageway-approximately 0.5 cm² |
| | (c) inside cross section of the second passageway-2.95 cm² |
| Feed: | (a) 100 l./h. of suspension with 150 g. of glass beads per liter of dirty water |
| | (b) 120 l./h. of scrubbing water |
| Discharge: | (a) 100 l./h. of suspension with 150 g. of glass beads per liter of water (description of bead condition to be inserted here) |
| | (b) 120 l./h. of dirty water |

EXAMPLE 5

| System and apparatus as set forth in Example 4. | |
|---|---|
| Installations | (a) 10 inclined plates, spacing between same points- 55 mm., inclination with respect to horizontal-50° |
| | (b) inside cross section of the first passageway-approximately 0.6 cm² |
| | (c) inside cross section of the second passageway-2.4 cm² |
| Feed: | (a) 100 l./hr. of suspension with 100 g. of glass beads per liter of dirty water |
| | (b) 105 l./hr. of washing water |
| Discharge: | (a) 100 l./h. of suspension with 100 g. of glass beads per liter of ater |
| | (b) 105 l./h. of dirty water. |

Operating conditions, i.e. pressure and temperature, in Examples 1 – 3 are the same; also, the same operating conditions are employed in Examples 4 and 5.

It will be appreciated from the foregoing description, that the size of the two passageways in the exchange column is related to the free column cross section and thus the flow resistance within the passages are dependent on the properties of the material, such as density, viscosity, shape factor of solid particles, etc., and the size of the streams of material. For the specific system of DMT/filtrate - methanol, the first passageway is about 0.7% of the free column cross section, and the second passageway is about 9% of the free column cross section. In general, it is estimated for solid-liquid systems that the first passageway will be approximately between 0.3 and 5% of the free column cross section and the second passageway will be about 5-20% of the free column cross section.

For a heterogeneous system of a gas and a suspension, i.e., for a gas-solid-liquid system, it is estimated that the first passageway will be about 0.1-4% of the free column cross section and the second passageway will be about 5-20% of the free column cross section Also, the formation of the vertical rotary flow is due primarily to the density differences of the two mass flows. Without the upper plate, a height of the turbulence would be obtained corresponding to the properties of the material and the streams of matter. If the upper plate is immersed in this freely forming eddy, a forced current is produced which compresses the eddy. Therefore, the plate spacing in the column depends on the requirements of each individual case.

The enrichment of the heavier phase, suspension, or the like, in the zone of the second passageway is due to the fact that this passage impeds the downwardly directed flow of the heavier phase, suspension, or the like. This impediment provided by the configuration of the passageway can be overcome the more easily, the greater the density of the matter stream, and the lower its viscosity etc. The downward flow of the heavier mass stream through the second passageway is controlled, so to speak, automatically, in that this mass stream is enriched above the passageway until the thus-caused hydrostatic pressure gradient is sufficient to overcome the impediment presented by the passageway.

It will also be understood that the angle of inclination of the plates inclined in a column as shown in FIGS. 4a and 4b should be as small as possible, since thereby the columns can be kept small in structural height. This angle should be as large as is necessary to obtain a favorable formation of the quiet or calm zones. In systems with solid particles, the angle of inclination is, at most, equal to the slope angle of the solid particles, but generally is much smaller.

While the novel embodiments of the invention have been described, it will be understood that various omissions, modifications and changes in these embodiments may be made by one skilled in the art without departing from the spirit and scope of the invention.

What is claimed is:

1. A process for mass transfer between heterogeneous systems or phases in a vertical exchange column having a plurality of plates, a heavier stream of matter being introduced above the plates and, a lighter stream of matter being introduced countercurrently thereto from the bottom of the plates, characterized in that:
   (a) a first heavier stream of matter fed from the top is angularly deflected, above one plate, into a first mixing zone wherein the heavier stream undergoes vertical rotary movement in one sense of direction and a lighter stream of matter passing from below through a first passageway of said one plate is introduced into the mixing zone and is caused to also undergo vertical rotary movement together with the heavier stream in the same sense of direction whereby mixing of the streams is effected;
   (b) a heavier phase, suspension, or the like fluid-like mass is formed in the mixing zone during the mass transfer therein and is accumulated in an enrichment zone below the mixing zone and superjacent to a second passageway of said one plate;
   (c) a lighter phase or like fluid-like mass is also formed in the mixing zone during the mass transfer therein and is directed upwardly above the mixing zone to provide another enrichment zone, said mixing zone extending between the enrichment zones; and
   (d) after a sufficient pressure gradient has been built up between the accumulated mass above the second passageway and a lighter stream below the first passageway, the accumulated mass flows as another heavier stream through the second passageway into a space underneath said one plate and is at this location angularly deflected into a second mixing zone wherein the another heavier stream undergoes vertical rotary movement, having a sense of direction of rotation opposite to that in the first mixing zone above said one plate, and is mixed with another lighter stream of matter fed from below in the same manner as mixing occurs in the first mixing zone, said second mixing zone also extending between two enrichment zones.

2. The process according to claim 1, wherein deflection of said heavier streams into the vertical rotary movement is effected by means of a deflecting device projecting into the inside cross section of the exchange column, said deflecting device being arranged to project from the edge or close to the edge of the exchange column and being inclined in the downward direction.

3. The process according to claim 1, wherein said exchange column is subdivided into several stages by said plurality of plates disposed in mutually spaced-apart relationship, and the streams of matter are set, in successive stages defined by said plates into vertical rotary movements with respectively opposite sense of rotation.

4. The process according to claim 1, wherein a particulate solid phase is a heavier stream separated from a mixing zone, said particulate solid phase being withdrawn in a sump of the exchange column, and a premixing liquid which loosens up the solid phase is introduced into the sump.

5. The process according to claim 1, wherein the heavier stream of matter introduced above said one plate contains a particulate solid phase, and during the startup period of the exchange column, no counterflow stream of matter, or only a relatively small quantity of counterflow stream is fed from the bottom of said one plate.

6. The process according to claim 5, wherein each plate is arranged horizontally.

7. The process according to claim 1, wherein the flow resistance occurring in the region of the first passageway is higher than that in the region of the second passageway.

8. The process according to claim 7, wherein the free passage cross section of the first passageway is between 1 and 25% of the second passageway, and the free passage cross section of the second passageway is between 3 and 33% of the free passage cross section of the exchange column.

9. The process according to claim 1, wherein the heavier stream of matter is a suspension of particulate solids and the lighter stream of matter is a scrubbing liquid, with the free passage cross section of the first passageway being between 0.3 and 5% of the free column cross section and the free passage cross section of the second passageway being about 5 to 20% of the free column cross section.

10. The process of claim 9, wherein said suspension is one formed of dimethyl terephthalate and a filtrate comprising a methanolic solution of the unusable residues of crude dimethyl terephthalate containing dimethyl isophthalate and dimethyl orthophthalate and higher-boiling substances and a minor proportion of dimethyl terephthalate and the scrubbing liquid is methanol, with the first passageway being about 0.7% of the free column cross section and the second passageway being about 9% of the free column cross section.

11. The process according to claim 1, wherein in the processing of a gas-solid-liquid system the free passage cross section of the first passageway is about 0.1–4% of the free column cross section and the free passage cross section of the second passageway is about 5–20% of the free column cross section.

12. An apparatus for effecting mass transfer between heterogeneous systems or phases comprising a vertical exchange column, inlet means for introducing a first heavier stream of matter into the top of said column, outlet means for withdrawing a heavier stream of matter from the bottom of said column, inlet means for introducing a lighter stream of matter into the bottom of said column, outlet means for discharging a lighter stream of matter from the top of said column, a plurality of plates extending substantially across the inside cross section of the exchange column, said plates being vertically spaced from each other, means defining a first passageway and a second passageway adjacent to the periphery of each plate; and a deflecting means obliquely arranged in a zone subjacent to the second passageway for angularly deflecting the flow of matter inwardly away from an inner wall of the column; said first and second passageways having selected dimensions so that a pressure gradient is obtained between the first and second passageways with a heavier stream of matter flowing with sufficient speed through the second passageway downwardly, and said passageways, and said deflecting means together providing means for controlling the flow of matter whereby the downwardly moving heavier stream is set into vertical rotary movement below the plate in a mixing zone and a lighter stream entering said mixing zone is deflected to undergo vertical rotary movement with the heavier stream of matter and whereby intensive intermixing of the heavier stream with the lighter stream is obtained within said mixing zone and a heavier phase or the like fluid-like mass is formed in the mixing zone and accumulates in a zone above a second passageway in one plate and a lighter phase or the like fluid-like mass is formed in the mixing zone and accumulates in a zone below the first passageway in another plate, with the mixing zone extending between said zones.

13. The apparatus according to claim 12, wherein the first passageway has a smaller free passage cross section than the second passageway.

14. The apparatus according to claim 12, wherein said exchange column is subdivided into several stages by said plurality of plates disposed in mutually spaced-apart relationship and in successive plates the first passageways are located mutually offset to each other.

15. The apparatus according to claim 14, wherein the corresponding passageways in each plate are arranged opposite to each other.

16. The apparatus according to claim 12, wherein the plates are arranged horizontally and the deflecting means is an inclined baffle plate means emanating from an outer edge of the exchange column, said deflecting means being mounted above one plate and leaving a gap between its inner edge and the plate.

17. The apparatus according to claim 12, wherein the plates are arranged so that each plate is inclined with respect to the longitudinal axis of the exchange column, and the upper portion of each plate also constitutes the deflecting means.

18. The apparatus according to claim 17, wherein each plate is provided, in addition to the first passageway, in the zone adjoining said first passageway, with further perforation means.

19. The apparatus according to claim 12, wherein the means defining said first and second passageways provides a free passage cross section in the first passage way, that is between 1 and 25% of the second passageway and a free passage cross section of the second passageway which is between 3 and 33% of the free passage cross section of the exchange column.

20. The process according to claim 14, further comprising introducing an initial heavier stream of matter into the top of the column and an initial lighter stream of matter into the bottom of the column and withdrawing a different heavier stream of matter from the bottom of the column and a different lighter stream from the top of the column.

21. The process according to claim 14, further comprising introducing an initial heavier stream of matter into the top of the column and an initial lighter stream of matter into the bottom of the column and withdrawing a different heavier stream of matter from the bottom of the column and a different lighter stream from the top of the column; the initial heavier stream of matter being a suspension formed of dimethyl terephthalate and filtrate comprising a methanoic solution of the unusable residues of crude dimethyl terephthalate containing dimethyl isophthalate and dimethyl ortho-phthalate and higher-boiling substances and a minor proportion of dimethyl terephthalate, the initial lighter stream of matter being a scrubbing liquid comprising methanol, the different heavier stream of matter withdrawn at the bottom of the column being a suspension of purified dimethyl terephthalate in methanol and the different lighter stream of matter withdrawn at the top being a mixture of filtrate and methanol.

* * * * *